United States Patent [19]

Preston

[11] Patent Number: 4,874,565
[45] Date of Patent: Oct. 17, 1989

[54] PLASTISOL SLUSH PROCESS

[75] Inventor: Frank J. Preston, Hampton, N.H.

[73] Assignee: Ex-Cell-O Corporation, Troy, Mich.

[21] Appl. No.: 185,101

[22] Filed: Apr. 22, 1988

Related U.S. Application Data

[63] Continuation of Ser. No. 851,017, Apr. 11, 1986, abandoned.

[51] Int. Cl.$^4$ .................. B29B 17/00; B29C 41/18
[52] U.S. Cl. .................................. 264/37; 264/302
[58] Field of Search .......................... 264/301–304, 264/306, 37

[56] References Cited

U.S. PATENT DOCUMENTS

| | | | |
|---|---|---|---|
| 896,852 | 8/1908 | McKee | 264/319 |
| 2,816,347 | 12/1957 | Ganz | 264/302 |
| 2,893,062 | 7/1959 | Penrice | 264/109 |
| 3,381,073 | 4/1968 | Brichard et al. | 264/154 |
| 3,728,429 | 4/1973 | Colby et al. | 264/310 X |
| 4,217,325 | 8/1980 | Colby | 264/245 |
| 4,621,995 | 11/1986 | Wersosky | 264/302 X |
| 4,683,098 | 6/1987 | Belleville et al. | 264/302 |
| 4,707,315 | 11/1987 | Joh et al. | 264/303 X |

FOREIGN PATENT DOCUMENTS

| | | | |
|---|---|---|---|
| 42-3952 | 5/1967 | Japan | 264/302 |
| 201247 | 1/1966 | Sweden | 264/302 |

Primary Examiner—Jan H. Silbaugh
Assistant Examiner—Karen D. Kutach
Attorney, Agent, or Firm—John C. Evans

[57] ABSTRACT

A method wherein an article is molded of liquid plastisol in a mold having mold heaters disposed adjacent the backside of a mold surface for controlling the temperature over respective first and second areas of the mold surface. First and second heating and cooling circuits are associated with each mold. To obtain liquid plastisol coating, the mold is filled by apparatus including a removable insert that reduces the quantity of plastisol that is used in the process to reduce the cycle time required for part molding. In one process, plastisol is pumped into and is removed from the mold with the mold insert in place. In another process the mold insert is removed from the mold and an intake tube remains in the mold to pump out excess material.

4 Claims, 2 Drawing Sheets

PLASTISOL SLUSH PROCESS

This is a continuation of application Ser. No. 851,017, filed on Apr. 11, 1986, now abandoned.

BACKGROUND OF THE INVENTION (1) Field of the Invention

This invention relates to a method and an assembly for practicing the method of molding hollow thin-walled articles from a heat-fusing material such as vinyl plastisol by slush molding.

Various vinyl plastisol compositions are known and used in various slush molding methods in various assemblies for performing those methods. Typically, an open hollow mold is filled with liquid plastisol and heat is applied to the mold surface and transferred to the liquid to gel a layer of plastisol adjacent the mold surface. The thickness of the gelled layer depends upon the temperature to which the plastisol layer is subjected and the time the plastisol is maintained at that temperature. After the layer adjacent the mold surface is gelled, the ungelled plastisol is dumped or poured out of the mold.

(2) Description of the Prior Art

In one well-known method, the mold temperature is maintained relatively low to prevent gelling as a very thin initial layer or coating of plastisol is applied to the mold to prevent bare spots and to prevent the entrapment of air bubbles, thereby providing a thin coating which strictly conforms to the mold configuration. Such a coating is applied by completely filling and completely emptying the mold except for the coated layer of material. For example, automotive dashboard or instrument panel covers are made in this fashion and the molds frequently include details to define imitation stitching in the finished product as well as undercuts and other intricate detail. A very thin coating is first applied to conform to the mold and to prevent irregularities in the outer surface of the finished product. After this very thin coating is applied, the mold is dumped and is again filled with additional plastisol and the entire mold is heated to gel the plastisol and increase the thickness of the finished product. After the desired thickness is attained, the mold is again dumped or emptied and thereafter the mold is subjected to additional heat for curing the product.

An example of such a method and an assembly for practicing same is shown in the U.S. Pat. No. 3,728,429 granted to Daniel E. Colby, Philip E. Rogers and Frederick J. Sliwinski on Apr. 17, 1973 and assigned to the assignee of the subject invention. That patent discloses such a method for slush molding articles wherein an endless conveyor moves a plurality of molds through various stations in the performance of the method. Each mold is separately filled with liquid plastisol to cover the mold surfaces and the fill is later dumped. U.S. Pat. No. 4,217,325 issued Aug. 12, 1980 discloses a single station apparatus more suited to short runs of parts and to quick and efficient changeovers from one plastisol to another. Although the methods and assemblies shown in these patents have proved to be very satisfactory, one disadvantage is that each of the molds is completely filled with liquid and the fill cycle time is established by the mold volume rather than the quantity of material deposited on the mold surfaces.

In the slush process currently employed for large parts, viz "modular - slush", a significant portion of the cycle time is taken up by filling the empty mold in some cases with as much as 300 pounds of plastisol and dumping more than 95% of this material back out. Only a small portion of the vinyl plastisol adduct is effectively used; the rest is process recycle. In a sense, the process can be visualized as an approximate 5% conversion process.

The fill time cycle is in part exacerbated because plastisol is a highly viscous material and cannot flow or be pumped at high speed. Further, the total wall area of the tool must be covered in order to make a skin with total integrity. Finally, the mold tools are often deep, resembling in some cases a contoured bathtub.

An object of the subject invention is to provide an improved method and assembly for reducing the fill cycle time in a process for producing a thickness of an article in a slush molding process in a mold of the open-ended type.

Another object is to provide an open-ended liquid plastisol mold associated with an insert disposed adjacent the mold surface where the material is deposited to form the finished article. A flow space between the mold surface and the insert is supplied with liquid to cover the mold surface with liquid plastisol to define a coating or layer. The volume of the flow space is substantially less than the total volume of the mold cavity which defines the mold surface to be coated. Consequently, the fill cycle time i considerably reduced. The flow space, however, enables a very thin coating of plastisol to be free of surface blemishes.

While the method and apparatus of U.S. Pat. No. 4,217,325 covers mold surfaces with a coating of plastisol, it requires that the mold be completely filled with liquid. The fill cycle time is thus dependent on the open mold volume required to define the surface of the part to be molded.

SUMMARY OF THE INVENTION

The subject invention provides an improved method and assembly for performing the method of controlling the thickness of an article made by a modular slush molding process for large parts including the step of providing a deep contoured mold cavity; providing a complementary insert and locating the insert within the slush mold cavity to form a reduced volume liquid plastisol flow passage and including a pump system for pumping plastisol into and out of the reduced volume to reduce the fill cycle time as compared to prior total fill methods.

Alternatively, during pump-out, an insert may be raised from the mold volume leaving a pump-pipe in fixed position, effectively allowing all excess liquid plastisol to drain to the bottom or low portion of the mold where it is pumped and/or dumped out. This method improves the time of the fill and dump cycle; reduces pumping energy costs; and reduces the lifetime of plastisol in storage since less volume of plastisol is required to manufacture a selected number of parts.

PRIOR ART STATEMENT

U.S. Pat. No. 4,217,325 discussed above discloses a slush molding process wherein the full volume of the cavity of the mold is completely filled with plastisol to coat mold surfaces and wherein the coating is cured to form a plastic part.

While not relevant to processes for manufacturing plastic components, various other processes disclose use of mold inserts. Exemplary references include U.S. Pat. No. 896,852 which discusses a mold system for making a flowerpot. It does not involve the problem of how to reduce large volumes of high viscosity plastisol in a recycle system or the problem of how to cover widely-spaced areas on a bathtub-shaped mold to produce a thin layer of build-up on selectively heated mold surfaces. U.S. Pat. No. 2,893,062 teaches the use of an insert pattern that forms a mold. However, the pattern is used to establish mold shapes and is not suggested for use in conjunction with slush molding processes. U.S. Pat. No. 3,381,073 shows a mold fill tube in a mold cavity. The mold fill tube becomes part of the finished part. It does not teach the slush mold fill and dump process of the present invention.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
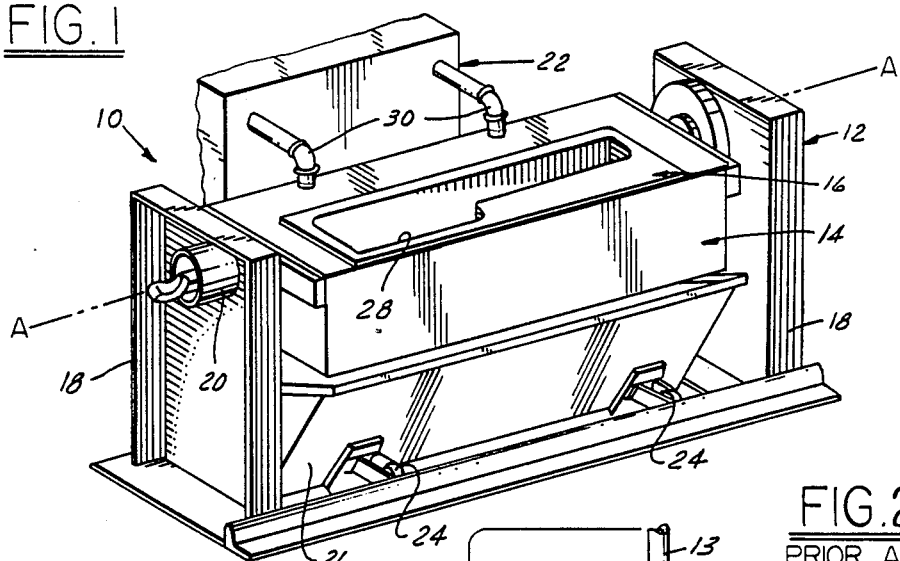
FIG. 1 is a diagrammatic view of a mold assembly used in accordance with the subject invention.

FIG. 1 shows a mold assembly generally indicated at 10 for use with the subject invention. The assembly 10 includes a stationary pedestal generally indicated at 12 for rotatably supporting a mold support means generally indicated at 14. The pedestal 12 rotatably supports the mold support means for rotation about the axis A—A. The mold support means 14 receives and supports an upwardly faced open-end mold 16. The mold 16 has a mold cavity 17 of deep bathtub configuration defining a mold surface 19.

The pedestal 12 is stationary and includes spaced support legs 18. The support legs 18 rotatably support the mold support means 14 through large circular bearings (not shown) disposed on collars or sleeves 20, which collars or sleeves 20 have accesses or openings through the center thereof, the purpose of which will be explained hereinafter. Suitable drive means for the mold support means 14 are set forth in U.S. Pat. No. 4,217,325 issued Aug. 12, 1980 which is incorporated herein by reference.

The assembly 10 also includes a movable modular plastisol supply unit generally shown at 22 for supplying liquid heat-fusing material such as plastisol to the open mold 16. The entire unit 22 is supported on a plurality of rollers 24 and includes a dump tank 26. The dump tank 26 is movable with the entire unit 22 and is normally disposed under the mold support means 14 when the unit 22 is in the fill operating position illustrated in FIG. 1. It is also placed relative to the pedestal 12 so that when the mold is inverted it will receive plastisol emptied from the mold 16 as the mold 16 is rotated for dumping or emptying into the dump tank 26.

Figure 5:
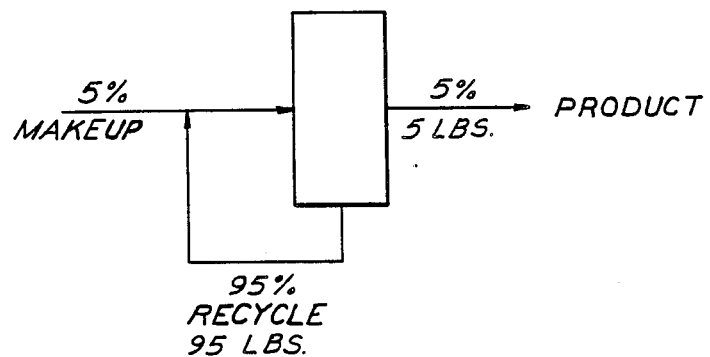
FIG. 5 is a diagram of the material flow in the prior art method.

The modular unit 22 is a plastisol supply and retrieval module for supplying liquid plastisol to the mold surface of the mold 16 and for retrieving liquid plastisol emptied or dumped from the mold 16. As best shown in FIG. 5, the slush process currently employed, for large parts especially, has a significant portion of the cycle taken up in filling the mold volume 17 so that the mold surface 19 can be coated to produce the article. The cycle time is determined by the large volume 17 rather than the amount of material which eventually ends up in the product. In some cases the amount of material required to fill an empty mold can be in the order of 300 pounds of liquid plastisol and 95% of the fill is then dumped back to the tank 26 for recycling. Thus, only a small portion of the liquid plastic is used for the product, the rest is process recycle. As shown in FIG. 5, the process represents a 5% conversion process.

Figure 2:
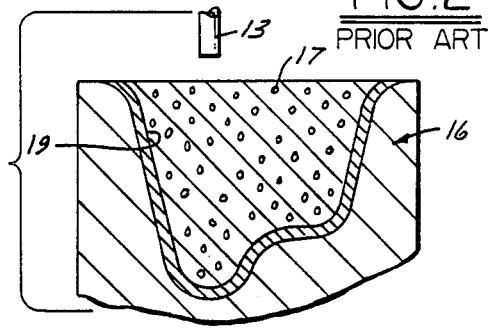
FIG. 2 is a diagrammatic view of a prior art method for filling the mold assembly of FIG. 1.

The reason for such inefficiency and an increased fill cycle time is due to the following characteristics of the process: (1) plastisol is a highly viscous material that be flowed or pumped at high speed; (2) total wall area of the mold must be covered to form an integral skin of total integrity; and (3) the mold in some cases requires a "deep" form to get the desired surface coating. Such "deep" forms in some cases resemble a contoured bathtub and have a high fill volume to deposited material ratio. A cross-section of such a mold is shown in FIG. 2 with the mold filled with a liquid plastisol to assure that the surface 19 will receive a thin coating of material during a heating cycle.

When the mold surface 19 is heated to a range of approximately 130° F. to 150° F. a thin coating is applied over the mold surface. This coating or layer is actually applied as the mold 16 is filled through an upper open end 28 and emptied of plastisol, as some of the liquid plastisol covers the mold surface or flows into the intricacies thereof during the emptying motion. After the mold is emptied, it is returned to the upright position. A limit switch is associated with the mold support means to provide a signal when the mold support means is returned to the upright position illustrated in FIG. 1. When the mold support means returns to the upright position, the mold surface can be heated by known heating means to a range of 250° F. to 260° F. as the mold is refilled or additional plastisol is placed in the mold for gelling the plastisol on the mold surface 19.

The temperature of certain segments of the mold surface 19 can be held at a non-gelling temperature. It will be appreciated by those skilled in the art that the temperature of the different mold surface areas may be raised for gelling before, during or after the filling of the mold, depending upon the design of the mold and other factors. A timer may be provided to provide a predetermined time that the plastisol is subjected to the 250° F. temperature of the mold for providing a predetermined thickness in the article before the mold support means 14 is again rotated for emptying the additional plastisol into the dump tank 26. When the mold support means 14 is rotated back to the upright position, all areas can be heated in a range of 350° F. to 400° F. for gelling the plastisol over all areas and curing or fusing the entire finished plastisol article. After the curing, the mold support means rotates to a position where the mold faces outwardly or is in a generally perpendicular position whereby the article may be stripped from the mold.

The present invention includes apparatus which replaces the illustrated free-standing spouts and dump tank 26. In the embodiment shown in FIG. 3, the mold 16 has an insert 32 with an outer surface 34 shaped complementary to a mold surface 19a. The insert 32 is located in spaced relationship to mold surface 19a so as to define a plastisol flow space 36 therebetween which has a filled volume approximately 20% of the filled volume in the prior art method of FIG. 2. In the FIG. 3 embodiment, a pump system 38 is provided with an inlet 40 connected to a source of liquid plastisol; a pump 42 which is reversing; and a standpipe 43 which has a flow port or entrance 45 that communicates the pump 42 with the low point 47 of flow space 36. During a fill cycle, the pump 42 discharges liquid plastisol into the space 36. Since its volume is only a fraction of the total mold volume, the fill cycle time is reduced commensurately (in the order of 70%-80%). Once the space 36 is filled to coat the surface 19a, excess liquid plastisol is drawn from the flow space 36 in a like manner by reversing the pump 42. The dump cycle time is less than the reduced fill cycle time since the input volume is reduced by the amount of material deposited on surface 19a. When the mold is in position for stripping the finished article the insert 32 is positioned externally of the mold.

Figure 3:
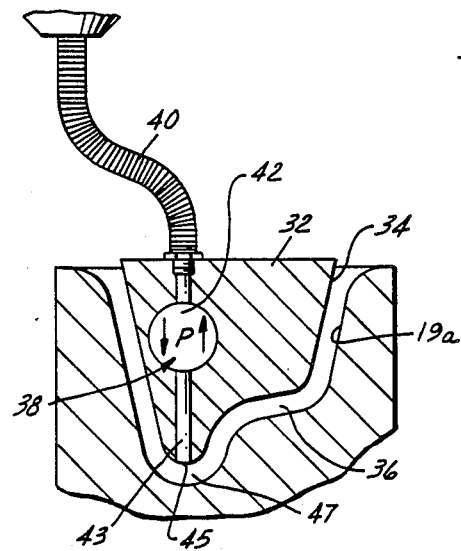
FIG. 3 is a diagrammatic view of apparatus for filling and recirculating liquid plastisol in accordance with the subject invention.
Figure 4:
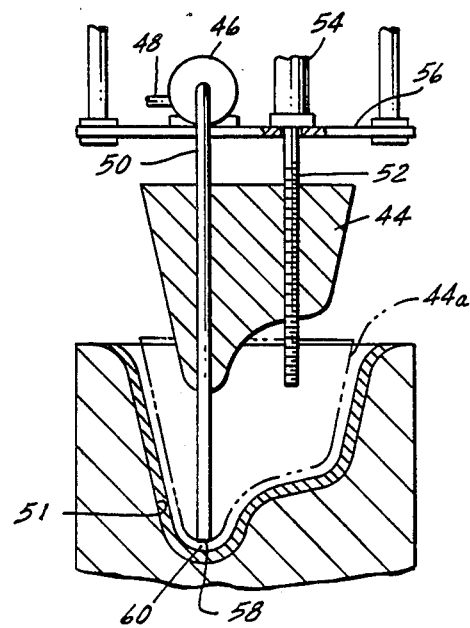
FIG. 4 is a diagrammatic view of another embodiment of apparatus for practicing the subject invention.

In the embodiment shown in FIG. 4, a mold insert 44, during fill, is positioned in the broken line position 44a. It serves the same function as the insert 32 in FIG. 3. In this embodiment, a pump 46 is external of insert 44. It has a conduit 48 adapted for connection to a liquid plastisol supply. The pump is connected to a standpipe 50 that remains stationary with respect to a mold surface 51. During fill, the insert 44 is moved to its fill position at 44a by a drive screw 52 rotated by a reversible motor 54 on a fixed platform 56 so as to raise and lower the insert 44. The insert 44 is spaced from the mold when in its lower "fill" position. The limited volume is filled when the pump 46 is operated in a fill mode. The pump 46 is reversed to draw excess plastisol from the mold through a flow port or entrance 58 to the standpipe 50 located at a low point 60 in the mold. In this embodiment, during pump-out, the insert 44 is raised from the mold volume. Its surface drains and the standpipe remains in a fixed lower position to pump out any excess (and drained) plastisol from the low point of the mold.

Figure 6:
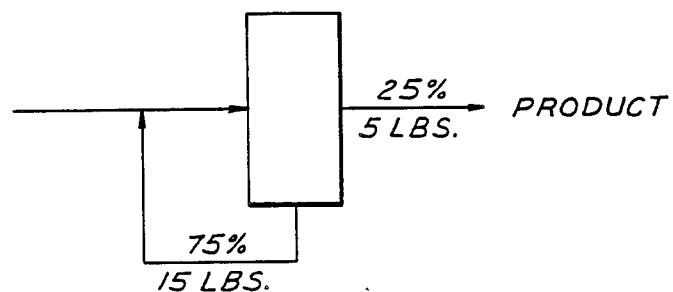
FIG. 6 is a diagram of the material flow in the method of the present invention.

FIG. 6 illustrates the process carried out in each of the FIG. 3 and FIG. 4 alternatives.

The input plastisol is directed to the reduced volume fill space; the volume of material required to fill the reduced volume fill space can be an order of magnitude less than the total input required in past practice. Further, of the reduced fill volume, 25% will be deposited on the mold and 75% will be recirculated.

The advantage of the process is that the fill time cycle is significantly reduced; the energy required to pump and recycle fluid in the process is significantly reduced and the lifetime of plastisol maintained in storage within the process apparatus can be significantly increased due to the lower amount of heat and mechanical work history that is experienced.

The embodiments of the invention in which an exclusive property or privilege is claimed are defined as follows:

1. In an open mold method for coating a thin plastic shell on a heated surface of an open ended mold cavity block having an open end and a low point by use of a conversion process in which less than 10 percent of a liquid plastisol charge is deposited as gelled material on the heated surface and a remainder of the liquid plastisol charge is recylcled back to a source of plastisol and wherein cycle time of the process is limited by time required to circulate the liquid plastisol into and from the mold cavity to fully coat the heated surface thereon, the improvement comprising:
   reducing fill volume in the open ended mold cavity block to substantially twenty percent of a volume of the open ended mold cavity block bounded by the heated surface of the open ended mold cavity block;
   directing a charge of the liquid plastisol from a source of material through the open end of the mold into the low point thereof and filling the reduced fill volume to fully coat the heated surface of the open ended mold cavity bock with the liquid plastisol material;
   recycling seventy-five percent of the liquid plastisol occupying the reduced fill volume and returning it to the source for reuse in subsequent filling of the reduced fill volume in the open ended mold cavity block;
   providing a movable insert having a volume reducing position in an interior of the mold and a plastisol recovery position out of the mold interior, locating the movable insert in its volume reducing position to reduce the fill volume of the open ended mold only when liquid plastisol is being directed into the reduced volume;
   and thereafter locating the insert in its plastisol recovery position for recovering plastisol waste from the insert as the liquid plastisol is being recycled back to the source.

2. In the method of claim 1, providing the insert with an opening therethrough, locating a flow pipe through the opening and reciprocating the insert with respect to the flow pipe to move the insert between its volume reducing position and its plastisol recovery position.

3. In the method of claim 1, providing a flow pipe for passage of plastisol into and out of the open-ended mold cavity block, maintaining the flow pipe in a constant vertical position with respect to the low point of the open ended mold cavity block; and
   raising the vertical position of the insert with respect to the low point of the open ended mold cavity block when in its plastisol recovery position so as to allow excess liquid to drain therefrom for collection and recycling from the low point of the open-ended mold cavity block.

4. In the method of claim 3, providing the insert with an opening therethrough, locating the flow pipe through the opening and reciprocating the insert with respect to the flow pipe to move the insert between its volume reducing position and its plastisol recovery position.

* * * * *